(12) United States Patent
Onoue

(10) Patent No.: US 9,335,579 B2
(45) Date of Patent: May 10, 2016

(54) DISPLAY DEVICE

(75) Inventor: Masato Onoue, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 113 days.

(21) Appl. No.: 14/117,435

(22) PCT Filed: May 11, 2012

(86) PCT No.: PCT/JP2012/062108
§ 371 (c)(1),
(2), (4) Date: Nov. 13, 2013

(87) PCT Pub. No.: WO2012/157547
PCT Pub. Date: Nov. 22, 2012

(65) Prior Publication Data
US 2014/0184980 A1    Jul. 3, 2014

(30) Foreign Application Priority Data

May 18, 2011  (JP) .................................. 2011-111341

(51) Int. Cl.
*G02F 1/1333* (2006.01)
*G02F 1/1335* (2006.01)

(52) U.S. Cl.
CPC ........ *G02F 1/133385* (2013.01); *G02F 1/1336* (2013.01); *G02F 2001/133628* (2013.01)

(58) Field of Classification Search
CPC .............. G02F 1/133385; G02F 2001/133628; G02F 1/1336; G02F 1/133308; G02F 2001/133311; G02F 2001/133314; G02F 2001/133317; G02F 2001/13332
See application file for complete search history.

(56) References Cited

U.S. PATENT DOCUMENTS

| 6,163,350 | A  | * | 12/2000 | Ihara ............................... 349/58 |
| 6,833,674 | B2 | * | 12/2004 | Kaneko .............. H05K 7/20972 313/11 |
| 7,667,964 | B2 | * | 2/2010  | Kang ................ G02F 1/133308 313/582 |
| 7,956,979 | B2 | * | 6/2011  | Oh .................... G02F 1/133385 349/161 |
| 8,264,659 | B2 | * | 9/2012  | Mikubo ........... G02F 1/133385 349/161 |
| 9,046,255 | B2 | * | 6/2015  | Shirai ............... G02F 1/133608 |

(Continued)

FOREIGN PATENT DOCUMENTS

| JP | 2007-052951 A | 3/2007 |
| JP | 2007-183436 A | 7/2007 |

(Continued)

OTHER PUBLICATIONS

Official Communication issued in International Patent Application No. PCT/JP2012/062108, mailed on Jun. 19, 2012.

*Primary Examiner* — Dennis Y Kim
(74) *Attorney, Agent, or Firm* — Keating & Bennett, LLP

(57) ABSTRACT

A liquid crystal display device 1 comprises a liquid crystal display panel 4, a backlight unit 20 emitting light toward the liquid crystal display panel 4, control substrates 9 for controlling the liquid crystal display panel 4 and the backlight unit 20, and an outer cover 2 containing the liquid crystal display panel 4, the backlight unit 20, and the control substrates 9. The control substrates 9 are arranged on the side opposite to the side including the display panel 4 with respect to the backlight unit 20, and the liquid crystal display device 1 further comprises a heat insulating frame 6, which is disposed between the backlight unit 20 and the control substrates 9, and which forms a space covering one surface of the backlight unit 20 on the side facing toward the control substrates 9.

9 Claims, 10 Drawing Sheets

(56) References Cited

U.S. PATENT DOCUMENTS

| | | | |
|---|---|---|---|
| 2002/0008805 A1* | 1/2002 | Kawakami et al. | 349/61 |
| 2004/0036819 A1* | 2/2004 | Ryu | G06F 1/1601 349/58 |
| 2004/0252254 A1* | 12/2004 | Koo | G02F 1/133308 349/58 |
| 2005/0124221 A1* | 6/2005 | Lin | H05K 7/20972 439/620.01 |
| 2006/0132699 A1* | 6/2006 | Cho | F04D 29/582 349/161 |
| 2007/0046617 A1* | 3/2007 | Song et al. | 345/102 |
| 2007/0290985 A1 | 12/2007 | Matsumoto et al. | |
| 2008/0165496 A1* | 7/2008 | Kang | G02F 1/133308 361/692 |
| 2009/0086430 A1* | 4/2009 | Kang et al. | 361/695 |
| 2009/0122218 A1* | 5/2009 | Oh et al. | 349/58 |

FOREIGN PATENT DOCUMENTS

| | | |
|---|---|---|
| JP | 2008-020881 A | 1/2008 |
| JP | 2008-053062 A | 3/2008 |

* cited by examiner

DISPLAY DEVICE

TECHNICAL FIELD

The present invention relates to a display device that includes an illuminator emitting light toward an object to be illuminated, such as a liquid crystal display panel, for example.

BACKGROUND ART

In a liquid crystal display device as typical one of display devices, because a liquid crystal display panel displaying an image generally does not emit light in itself, an illuminator needs to be arranged on the side opposite to a display surface of the liquid crystal display panel, i.e., on the backside of the liquid crystal display panel. The illuminator emits light toward the liquid crystal display panel, i.e., an object to be illuminated, whereby the liquid crystal display device can display an image on its screen. Such an illuminator arranged on the backside opposite to the display surface of the liquid crystal display panel is called, e.g., a backlight unit.

For example, a cold cathode fluorescence lamp or an LED (light emitting diode) is widely used as a light source for the backlight unit. Furthermore, the illumination type of the backlight unit is mainly divided into two, i.e., the direct type and the edge light type. In the direct backlight unit, plural light sources are arranged directly below the liquid crystal display panel, i.e., in a region facing a rear surface of the liquid crystal display panel. In the edge light backlight unit, a light guide plate is arranged on the backside of the liquid crystal display panel, the light guide plate having substantially the same size as that of the rear surface of the liquid crystal display panel, and a linear light source is arranged at an edge of the light guide plate. Light from the linear light source is guided for illumination in the planar form through the light guide plate.

Patent Literature (PTL) 1 discloses one example of related-art display devices including display panels and backlight units as described above. The display device disclosed in PTL 1 includes a liquid crystal display panel, a backlight unit including a light source constituted by a cold cathode tube and a light guide plate, and a control substrate for the liquid crystal display panel and the backlight unit. The control substrate is disposed on the backside of the backlight unit, i.e., on the side opposite to the liquid crystal display panel with respect to the backlight unit.

CITATION LIST

Patent Literature

PTL 1: Japanese Unexamined Patent Application Publication No. 2008-20881 (pages 6 to 7, FIGS. 3 and 4)

SUMMARY OF INVENTION

Technical Problem

In the configuration of the related-art display device disclosed in PTL 1, however, when the backlight unit is not the edge light type, but it is the direct type, there is a high possibility that the rear surface of the backlight unit exhibits a comparatively high temperature. Accordingly, when the control substrate is arranged on the backside of the backlight unit, the control substrate is directly exposed to heat generated from the rear surface of the backlight unit, thus causing a risk that electronic parts, such as ICs, on the control substrate may malfunction or may be damaged.

One conceivable solution to the above-mentioned problem is to provide a blower, e.g., a fan, on the backside of the backlight unit. The provision of the blower is expected to make air flow on the backside of the backlight unit to forcibly expel high-temperature heat to the outside. However, recent liquid crystal display devices are demanded to have an even higher illuminance, for example, and electric power supplied to the backlight unit has increased more and more. Accordingly, a sufficient heat dissipating effect cannot be obtained just by making air flow on the backside of the backlight unit, and there still exists a fear that adverse influences upon the electronic parts on the control substrate due to heat cannot be avoided.

The present invention has been accomplished in view of the above-described situations in the art, and an object of the present invention is to provide a display device, which can prevent heat of an illuminator, such as a backlight unit, from adversely affecting a control substrate that controls the illuminator and a display panel, and which can realize stable display operation.

Solution to Problem

To solve the above-described problems, the present invention provides a display device comprising a display panel displaying an image, an illuminator emitting light toward the display panel, a control substrate for controlling the display panel and the illuminator, and a housing containing the display panel, the illuminator, and the control substrate, wherein the control substrate is arranged within the housing on side opposite to side including the display panel with respect to the illuminator, and the liquid crystal display device further comprises a frame, which is disposed between the illuminator and the control substrate, and which forms a space covering one surface of the illuminator on side facing toward the control substrate.

With that feature, on the side opposite to the side including the display panel with respect to the illuminator, i.e., on the backside of the illuminator relative to the display panel, heat generated from a rear surface of the illuminator is enclosed in the space formed by the frame between the rear surface of the illuminator and the control substrate. Accordingly, a heat insulating layer is formed by the frame between the rear surface of the illuminator and the control substrate.

Furthermore, in the display device constituted as described above, the frame is formed of a heat insulating member.

With that feature, transfer of heat in the heat insulating layer, formed by the frame, to the control substrate is blocked by the frame itself, which is the heat insulating member. Another heat insulating material may be disposed, for example, by being bonded to the inner side of the frame. Moreover, a heat dissipating member, such as a heat dissipating fin, for efficiently dissipating the heat of the illuminator to the heat insulating layer formed by the frame, may be disposed, for example, by being bonded to the inner side of the frame.

Still further, in the display device constituted as described above, the frame has an intake port allowing air to flow into the frame therethrough, and the display device further comprises an exhaust channel for communicating inside of the frame and outside of the housing with each other, and a fan for exhausting air within the frame to the outside of the housing through the exhaust channel.

With that feature, the heat generated from the rear surface of the illuminator is exhausted to the outside of the housing, i.e., the outside of the display device, without contacting with the control substrate.

Still further, in the display device constituted as described above, the exhaust channel extends from the frame toward the housing on the side opposite to the side including the display panel with respect to the illuminator.

With that feature, since the heat generated from the rear surface of the illuminator is exhausted to the backside of the display device, a person looking at the display panel of the display device, i.e., at a display screen, can be avoided from feeling uncomfortable with the dissipated heat.

Still further, in the display device constituted as described above, a heat dissipating portion for dissipating heat of the illuminator is disposed within the frame on a surface of the illuminator on side facing toward the control substrate.

With that feature, a heat dissipating action from the rear surface of the illuminator is increased.

Advantageous Effects of Invention

With the features of the present invention, since the heat insulating layer is formed between the rear surface of the illuminator and the control substrate, the heat generated from the rear surface of the illuminator is less transferable to the control substrate. Furthermore, since the fan is provided to dissipate the air within the frame to the outside of the housing, the heat generated from the rear surface of the illuminator can be exhausted to the outside of the display device without contacting with the control substrate. It is hence possible to provide the display device, which can prevent the heat of the illuminator, such as a backlight unit, from adversely affecting the control substrate that controls the illuminator and the display panel, and which can realize stable display operation.

DESCRIPTION OF EMBODIMENTS

Embodiments of the present invention will be described below with reference to FIGS. 1 to 10. The following description is made in connection with a liquid crystal display device as one example of a display device of the present invention.

Figure 1:
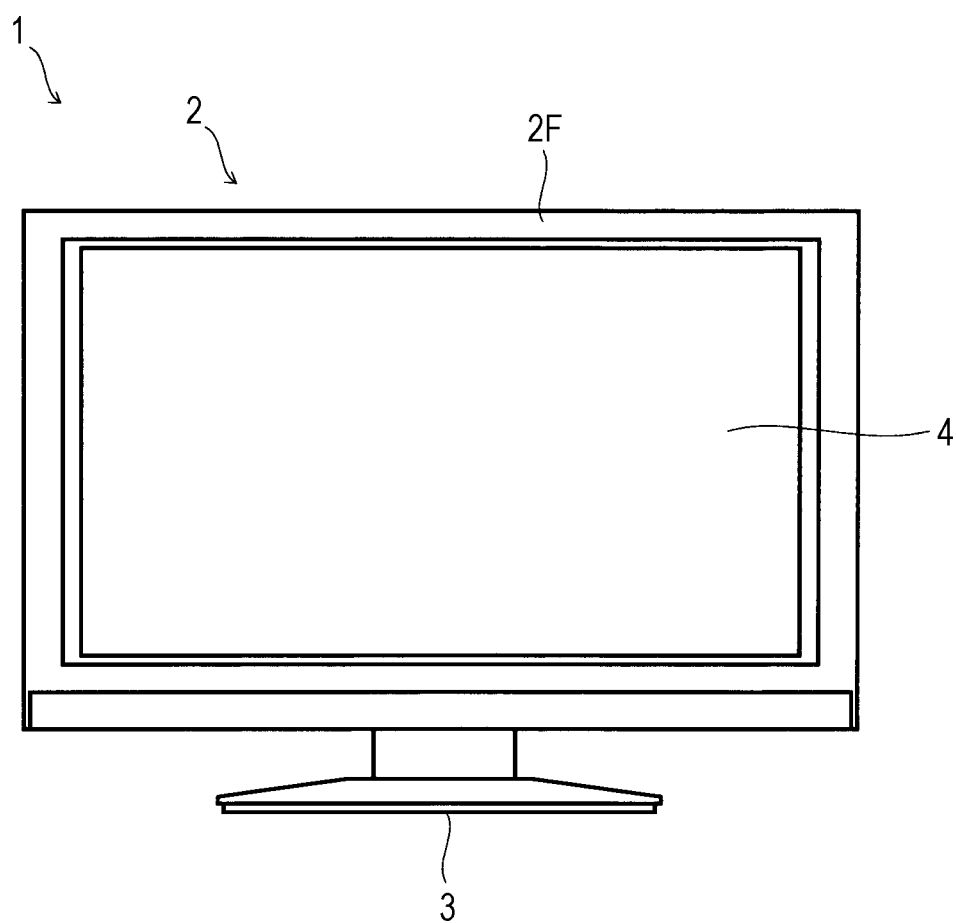
FIG. 1 is a front view of a liquid crystal display device according to a first embodiment of the present invention.
Figure 2:
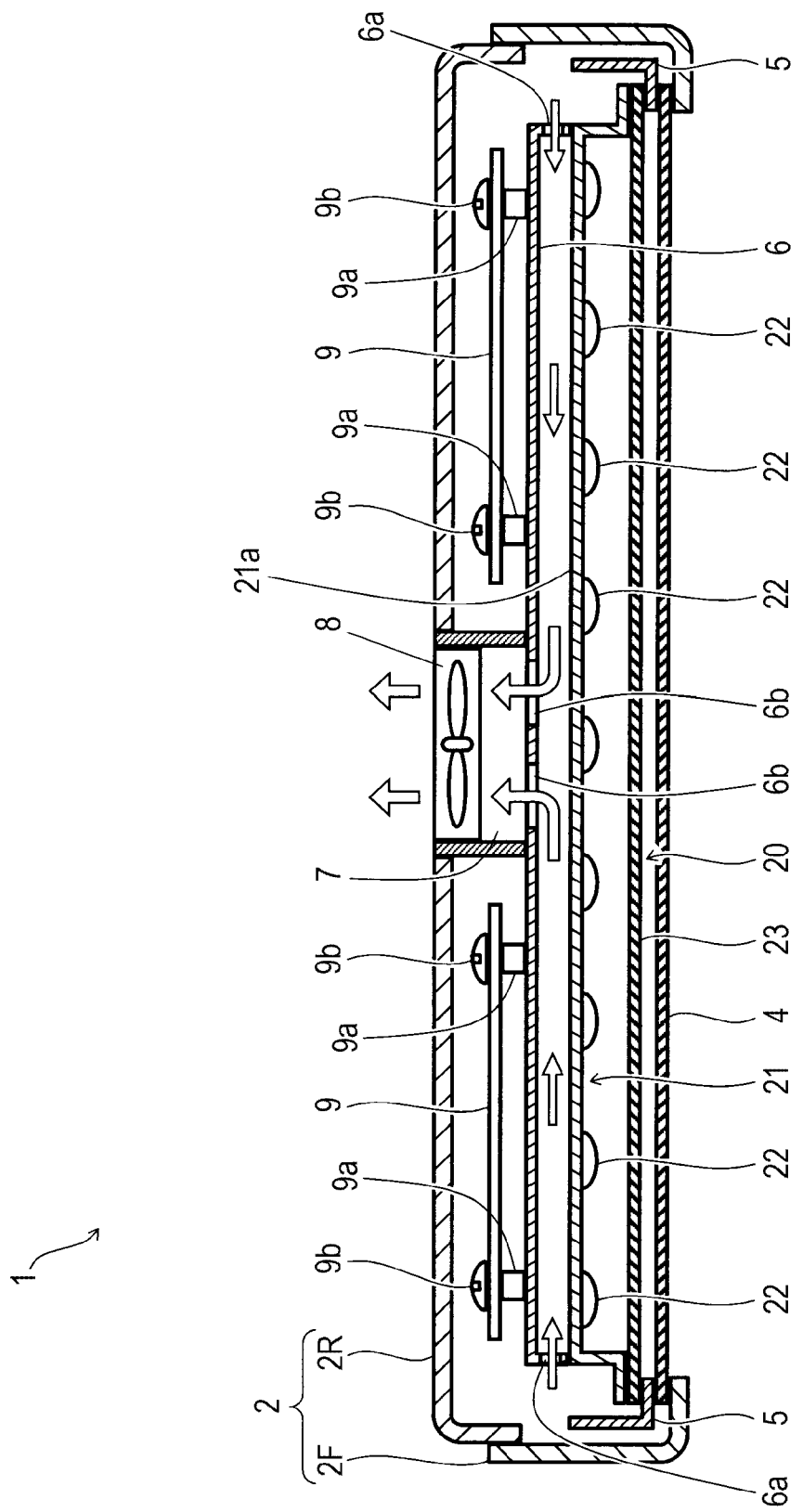
FIG. 2 is a horizontal sectional view, looking from above, of the liquid crystal display device according to the first embodiment of the present invention.
Figure 3:
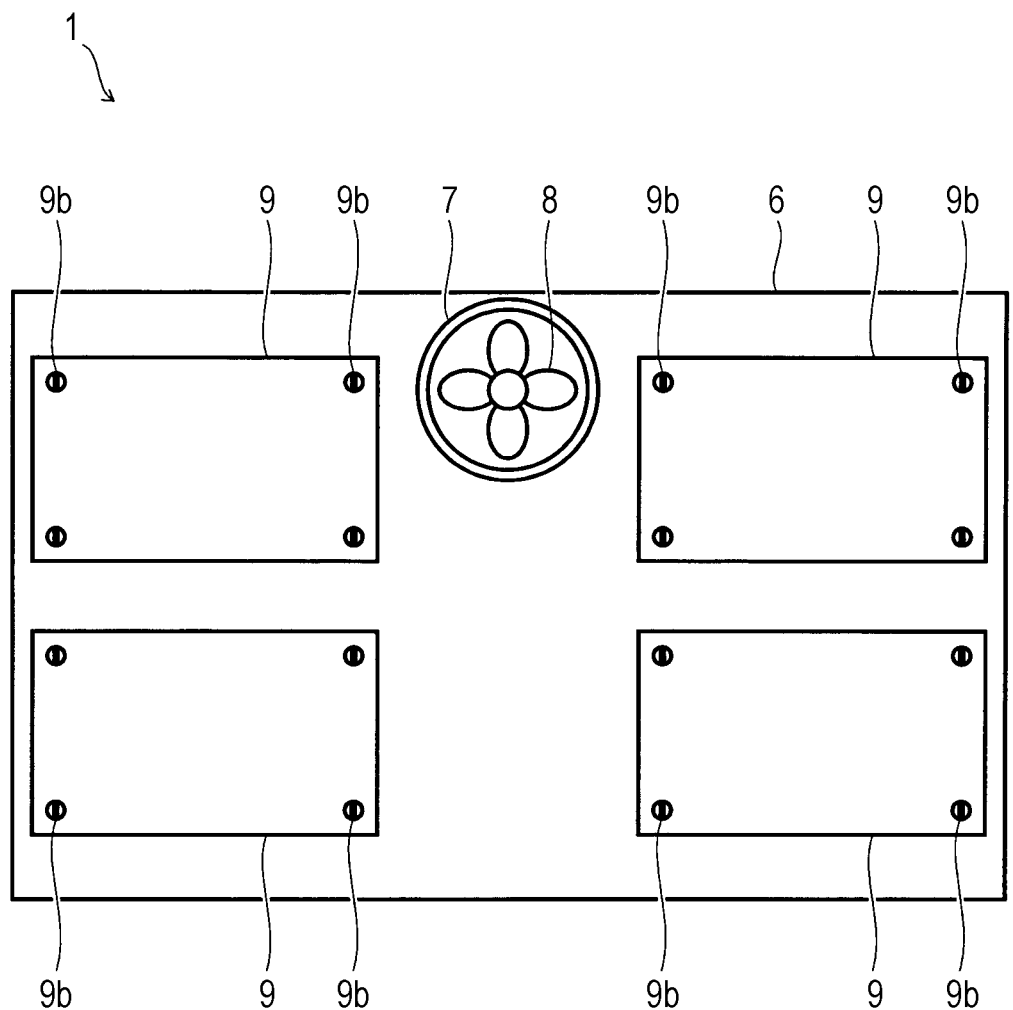
FIG. 3 is a rear view of a heat insulating frame of the liquid crystal display device according to the first embodiment of the present invention.
Figure 4:
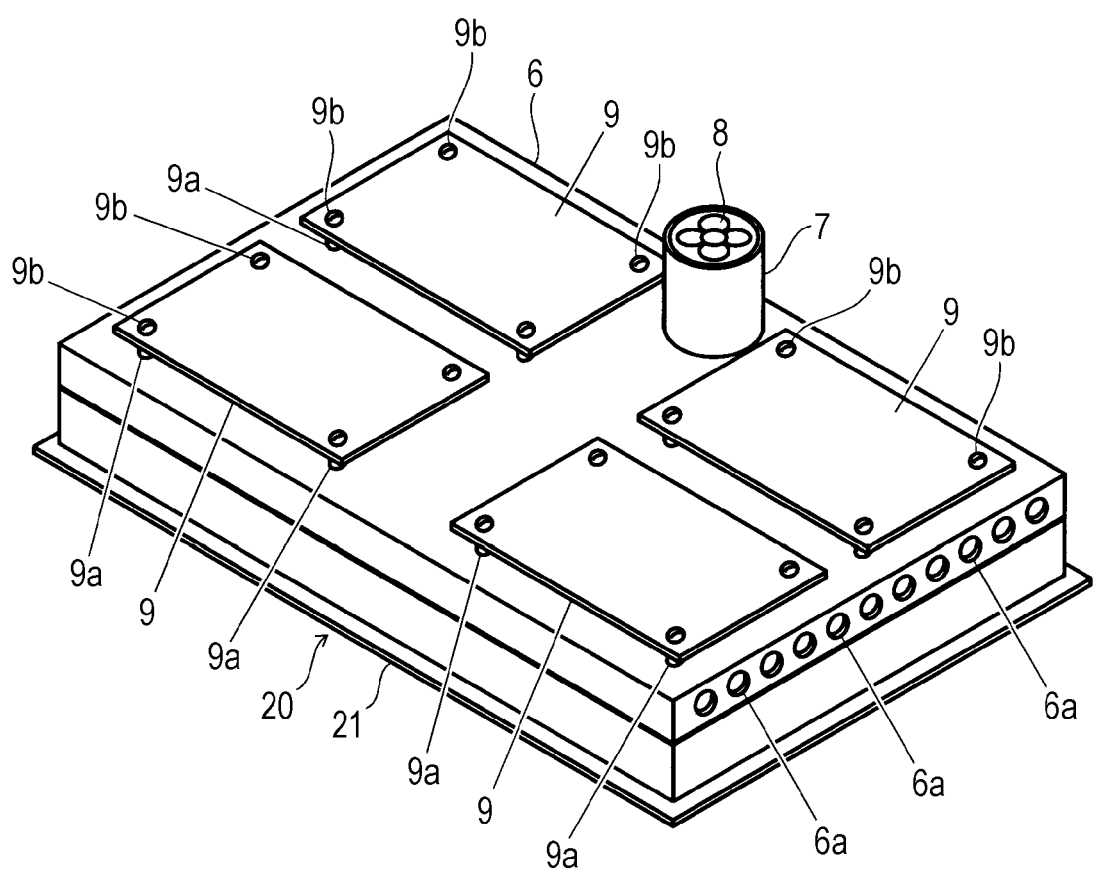
FIG. 4 is a perspective view, looking from the backside, of a backlight unit, the heat insulating frame, and an exhaust channel of the liquid crystal display device according to the first embodiment of the present invention.

First, a structure of a liquid crystal display device according to a first embodiment of the present invention is described with reference to FIGS. 1 to 4. FIG. 1 is a front view of the liquid crystal display device, and FIG. 2 is a horizontal sectional view, looking from above, of the liquid crystal display device. FIG. 3 is a rear view of a heat insulating frame of the liquid crystal display device, and FIG. 4 is a perspective view, looking from the backside, of a backlight unit, the heat insulating frame, and an exhaust channel of the liquid crystal display device. Empty arrows in FIG. 2 indicate flow paths and flowing directions of air streams that are generated by a fan. In the following description, the words "front" and "rear" are defined as follows. When, relative to some member or position, another member or position is located closer to the front side of the liquid crystal display device, the latter is expressed as being located on the "front" side, and when the other member or position is located closer to the rear side of the liquid crystal display device, it is expressed as being located on the "rear" side.

A liquid crystal display device 1 is a display device using a liquid crystal to display an image and has a substantially rectangular shape (quadrate shape), in a plan view, extending long in the right-and-left direction, as illustrated in FIGS. 1 and 2. The liquid crystal display device 1 includes an outer cover 2 serving as a housing and having a flattened rectangular box-like shape. The outer cover 2 is horizontally long and is supported on a stand 3 in an upright posture.

The outer cover 2 includes a front cover 2F and a rear cover 2R. The front cover 2F has a shape of the so-called picture frame with a rectangular opening formed in a front surface thereof. The rear cover 2R is fitted to the front cover 2F in a way covering the backside of the front cover 2F, thus forming the outer cover 2 having the rectangular box-like shape.

Within the outer cover 2, there are disposed a liquid crystal display panel 4, a panel holder 5, a backlight unit 20, a heat insulating frame 6, an exhaust channel 7, an exhaust fan 8, and a control substrate 9, as illustrated in FIG. 2.

The liquid crystal display panel 4 is in the form of a rectangular plate and is arranged just inside the front opening of the front cover 2F. The liquid crystal display panel 4 includes an active matrix substrate, a counter substrate (color filter substrate), and a polarizing sheet, though not illustrated, each having a rectangular shape. Those substrates and sheet are bonded to each other with a sealing material or the like (not illustrated) interposed therebetween such that their predetermined surfaces face each other. The active matrix substrate includes pixel electrodes on its predetermined surface. The counter substrate includes common electrodes on its predetermined surface. Furthermore, a liquid crystal is enclosed between the active matrix substrate and the counter substrate. The liquid crystal display panel 4 adjusts orientation of the liquid crystal by an electric field that is generated between the pixel electrodes of the active matrix substrate and the common electrodes of the counter substrate in accordance with an image signal, thereby changing transmittance of light passing through the liquid crystal.

The panel holder 5 is arranged on the backside of a peripheral edge portion of the liquid crystal display panel 4. The panel holder 5 has a shape of a rectangular picture frame having such a size as allowing the panel holder 5 to be just accommodated inside the front cover 2F. An opening similar to the front opening of the front cover 2F is formed in the panel holder 5. Moreover, the panel holder 5 holds the liquid crystal display panel 4 between the panel holder 5 and an inner surface of the front cover 2F in sandwiching relation. Additionally, the liquid crystal display panel 4 is irradiated with light, emitted from the backlight unit 20, through the opening of the panel holder 5.

The backlight unit 20 is arranged at the back of the liquid crystal display panel 4 over a region corresponding to an entire rear surface thereof. The backlight unit 20 is an illuminator of the direct illumination type, and it includes a backlight chassis 21, LEDs 22, and an optical sheet group 23.

The backlight chassis 21 is formed in a substantially rectangular box-like shape, in a plan view, and is opened on the side closer to the liquid crystal display panel 4. The backlight chassis 21 accommodate therein a plurality of LEDs 22 as light sources, which are disposed on an inner surface of a rear wall portion 21a of the backlight chassis 21.

The LEDs 22 are each a light source for emitting light that serves as backlight light for the liquid crystal display panel 4. Each LED 22 is constituted by, e.g., a white LED (light emitting diode) emitting white light. The LEDs 22 are each in the form of a block having a size of 3 mm to 8 mm, and are arranged on the entire inner surface of the rear wall portion 21a of the backlight chassis 21 in a substantially lattice array. The interval between the LEDs 22 is set to, e.g., 30 mm. It is to be noted that the light source is not limited to the LED, and that the LED is not limited to one emitting white light. The number and the layout of the LEDs 22 are also not limited to the examples illustrated in FIG. 2.

The optical sheet group 23 includes, though not illustrated, a diffusion plate, a prism sheet, and a lens sheet. The optical sheet group 23 is arranged on the front side of the backlight chassis 21 so as to close the opening of the backlight chassis 21, thus covering a layout region of the plural LEDs 22 from the side closer to the liquid crystal display panel 4. The diffusion plate directly receives the lights emitted from the LEDs 22, and diffuses the lights to be spread over an entire area of the liquid crystal display panel 4. The prism sheet deflects radiation characteristics of the lights received from the diffusion plate. The lens sheet suppresses a light-dark difference, which causes variations in light amount, among the lights received from the prism sheet.

The backlight unit 20 constituted as described above emits the planar and uniform backlight light, free from variations, to be applied to the rear surface of the liquid crystal display panel 4 for illumination. The liquid crystal display panel 4 changes the transmittance of the backlight light passing through the liquid crystal in accordance with the image signal, whereby a desired image is displayed on a display screen of the liquid crystal display panel 4.

The heat insulating frame 6 is arranged at the back of the backlight unit 20. The heat insulating frame 6 has a size adapted for covering a rear surface of the backlight unit 20, i.e., an entire outer surface area of the rear wall portion 21a of the backlight chassis 21, and it is formed in a substantially rectangular box-like shape, in a plan view, which is opened on the side closer to the backlight chassis 21. Moreover, the heat insulating frame 6 forms a space covering the entire outer surface area of the rear wall portion 21a of the backlight chassis 21.

The heat insulating frame 6 is formed of a heat insulating member that is made of, e.g., synthetic resin having comparatively high heat-insulating efficiency. Additionally, another heat insulating material, such as glass wool or polyethylene resin foam, may be disposed, for example, by being bonded to the inner rear side of the heat insulating frame 6.

As illustrated in FIGS. 2 and 4, the heat insulating frame 6 has a plurality of intake ports 6a formed in right and left lateral surfaces. The intake ports 6a penetrate through the heat insulating frame 6 for communication between the inner side and the outer side thereof, thus enabling air outside the heat insulating frame 6 to flow into the heat insulating frame 6. Furthermore, as illustrated in FIG. 2, the heat insulating frame 6 includes exhaust ports 6b formed in a rear surface of the heat insulating frame 6 at an upper region of its central portion when viewed in the right-and-left direction. Similarly to the intake ports 6a, the exhaust ports 6b penetrate through the heat insulating frame 6 for communication between the inner side and the outer side thereof, thus enabling air inside the heat insulating frame 6 to be exhausted to the exterior.

As illustrated in FIGS. 2 to 4, the exhaust channel 7 is disposed at the back of the heat insulating frame 6 in a region corresponding to the exhaust ports 6b of the heat insulating frame 6, i.e., at a position above the central portion of the rear surface of the heat insulating frame 6 when viewed in the right-and-left direction. The exhaust channel 7 has a cylindrical shape and extends straightly from the rear surface of the heat insulating frame 6 toward the rear cover 2R, which defines a rear surface of the liquid crystal display device 1, in surrounding relation to the exhaust ports 6b of the heat insulating frame 6. The inside of the heat insulating frame 6 and the outside of the rear cover 2R are communicated with each other through the exhaust channel 7.

The exhaust fan 8 is constituted as an axial fan, for example, and is arranged in a rear end portion of the exhaust channel 7, as illustrated in FIGS. 2 and 3. The exhaust fan 8 can introduce air, which has been exhausted from the inside of the heat insulating frame 6 through the exhaust ports 6b, to the exhaust channel 7, and further can forcibly expel the exhaust gas to the outside of the rear cover 2R through the exhaust channel 7.

As illustrated in FIGS. 2 to 4, the control substrate 9 is arranged at the back of the heat insulating frame 6. The control substrate 9 is disposed in number four, for example, and each of the control substrates 9 is fixed to the rear surface of the heat insulating frame 6 by screws 9b with a spacing held therebetween by employing spacers 9a. The control substrates 9 have respective functions of an LCD controller (i.e., control of the display panel 4), an LED controller (i.e., control of the backlight unit 20), a video controller, and so on.

Thus, in the liquid crystal display device 1, the control substrates 9 are arranged within the outer cover 2 on the side opposite to the side including the display panel 4 with respect to the backlight unit 20. Moreover, the liquid crystal display device 1 includes the heat insulating frame 6, which is disposed between the backlight unit 20 and the control substrates 9, and which forms a space covering one surface of the backlight unit 20 on the side facing toward the control substrates 9, i.e., the rear surface of the backlight unit 20. With such an arrangement, on the backside of the backlight unit 20, heat generated from the rear surface of the backlight unit 20 is enclosed in the space that is formed by the heat insulating frame 6 between the rear surface of the backlight unit 20 and the control substrates 9. Accordingly, a heat insulating layer is formed by the heat insulating frame 6 between the rear surface of the backlight unit 20 and the control substrates 9. It is hence possible to make the heat, generated from the rear surface of the backlight unit 20, less transferrable to the control substrates 9.

Furthermore, since the heat insulating frame 6 is formed of the heat insulating member made of synthetic resin, for example, transfer of heat in the heat insulating layer, formed by the heat insulating frame 6, to the control substrates 9, is blocked by the heat insulating frame 6 itself. Accordingly, the heat generated from the rear surface of the backlight unit 20 can be made even less transferrable to the control substrates 9.

Moreover, in the liquid crystal display device 1, the heat insulating frame 6 includes the intake ports 6a allowing air to flow into the heat insulating frame 6 therethrough, the exhaust channel 7 communicating the inside of the heat insulating frame 6 and the outside of the outer cover 2 with each other, and the exhaust fan 8 for exhausting the air within the heat insulating frame 6 to the outside of the outer cover 2 through the exhaust channel 7. With such an arrangement, the heat generated from the rear surface of the backlight unit 20 is dissipated to the outside of the outer cover 2, i.e., the outside of the liquid crystal display device 1, without contacting with the control substrates 9. As a result, transfer of the heat generated from the rear surface of the backlight unit 20 to the control substrates 9 can be further suppressed.

In addition, the exhaust channel 7 extends from the heat insulating frame 6 toward the rear cover 2R that is positioned on the side opposite to the side including the display panel 4 with respect to the backlight unit 20. With such an arrangement, the heat generated from the rear surface of the backlight unit 20 is dissipated to the backside of the liquid crystal display device 1, and a person looking at the display panel 4 of the liquid crystal display device 1, i.e., at the display screen, can be avoided from feeling uncomfortable with the dissipated heat. Thus, the person can view the display screen comfortably while the transfer of the heat generated from the rear surface of the backlight unit 20 to the control substrates 9 is suppressed.

With the above-described configuration of the first embodiment of the present invention, the heat insulating layer is formed by the heat insulating frame 6 between the rear surface of the backlight unit 20 and the control substrates 9, and the heat generated from the rear surface of the backlight unit 20 is less transferable to the control substrates 9. Moreover, because the exhaust fan 8 for exhausting the air within the heat insulating frame 6 to the outside of the outer cover 2 is provided, the heat generated from the rear surface of the backlight unit 20 can be dissipated to the outside of the liquid crystal display device 1 without contacting with the control substrates 9. It is hence possible to provide the liquid crystal display device 1, which can prevent the heat of the backlight unit 20 from adversely affecting the control substrates 9 that control the backlight unit 20 and the display panel 4, and which can realize stable display operation.

Figure 5:
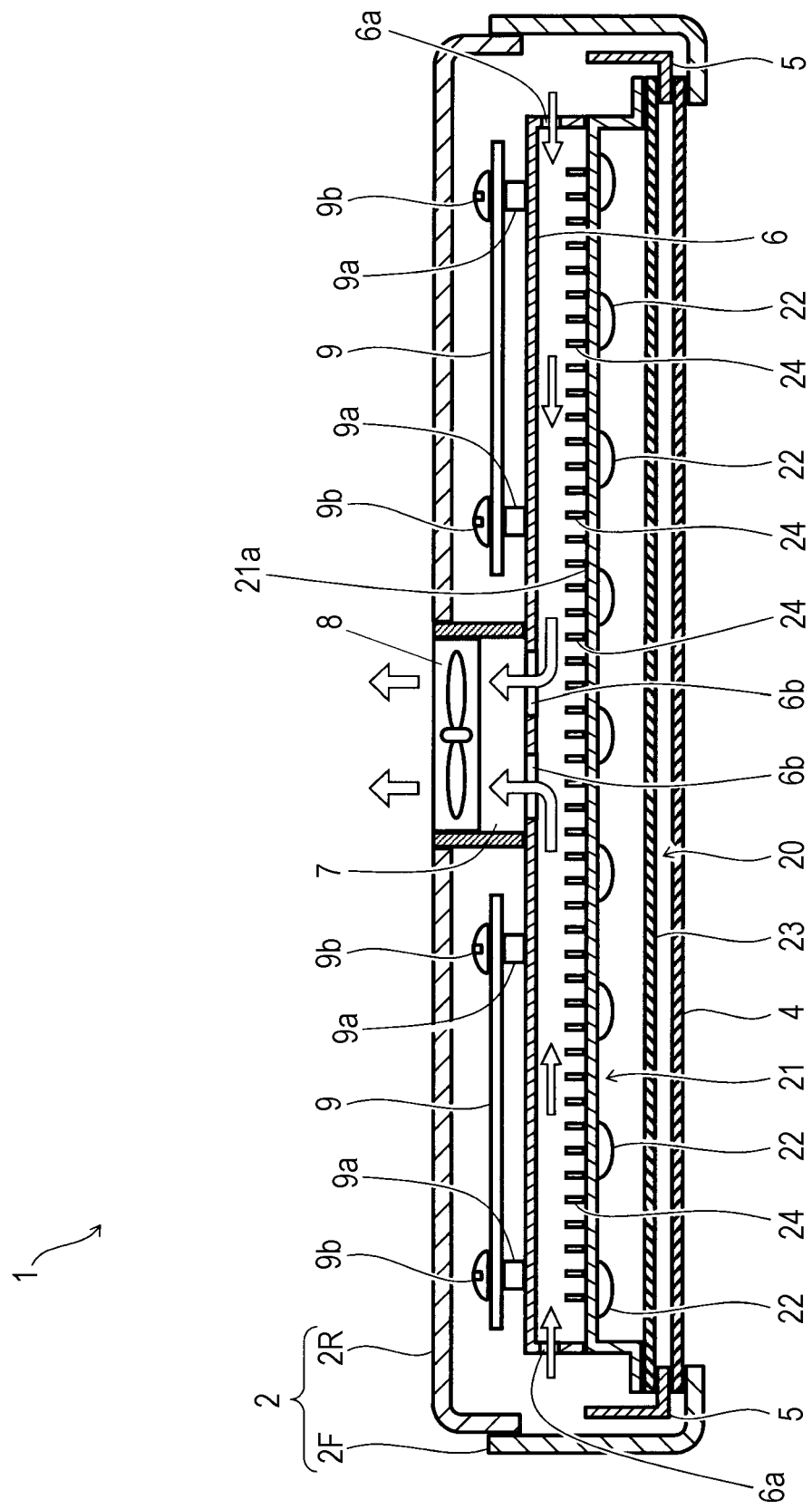
FIG. 5 is a horizontal sectional view, looking from above, of a liquid crystal display device according to a second embodiment of the present invention.

A liquid crystal display device according to a second embodiment of the present invention will be described below with reference to FIG. 5. FIG. 5 is a horizontal sectional view, looking from above, of the liquid crystal display device. It is to be noted that, because a basic configuration of the second embodiment is the same as that of the first embodiment described above with reference to FIGS. 1 to 4, constituent elements common to those in the first embodiment are denoted by the same reference signs and they are omitted from the drawings and the following description. Empty arrows in FIG. 5 indicate flow paths and flowing directions of air streams that are generated by a fan.

In the liquid crystal display device 1 according to the second embodiment, as illustrated in FIG. 5, the backlight unit 20 includes a heat dissipating portion 24 disposed on the rear surface thereof, i.e., in the space formed by the heat insulating frame 6. The heat dissipating portion 24 is constituted by arranging a plurality of fins substantially at equal intervals.

With the configuration of the second embodiment, since the heat dissipating portion 24 for dissipating the heat of the backlight unit 20 is disposed within the heat insulating frame 6 on the rear surface of the backlight unit 20 on the side facing toward the control substrates 9, the heat dissipating action from the rear surface of the backlight unit 20 is increased. Accordingly, the heat of the backlight unit 20 can be dissipated more efficiently. In addition, the heat can be dissipated to the outside of the liquid crystal display device 1 without contacting with the control substrates 9.

Figure 6:
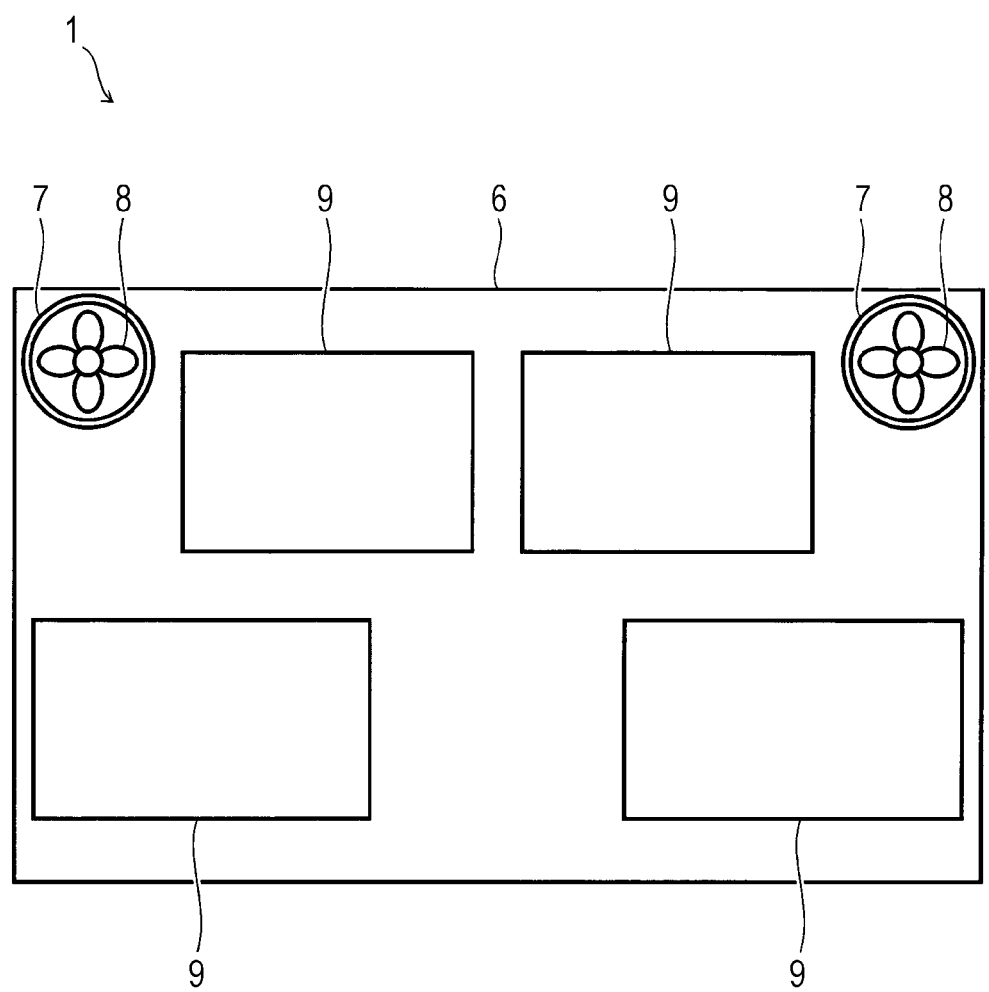
FIG. 6 is a rear view of a heat insulating frame of a liquid crystal display device according to a third embodiment of the present invention.

A liquid crystal display device according to a third embodiment of the present invention will be described below with reference to FIG. 6. FIG. 6 is a rear view of a heat insulating frame of the liquid crystal display device. It is to be noted that, because a basic configuration of the third embodiment is the same as that of the first embodiment described above with reference to FIGS. 1 to 4, constituent elements common to those in the first embodiment are denoted by the same reference signs and they are omitted from the drawings and the following description. In this regard, the screws 9b illustrated in FIG. 3 are omitted from FIG. 6.

In the liquid crystal display device 1 according to the third embodiment, as illustrated in FIG. 6, the exhaust channel 7 and the exhaust fan 8 are each disposed at two positions, i.e., on an upper left end portion and an upper right end portion of the rear surface of the heat insulating frame 6. By providing the pair of the exhaust channel 7 and the exhaust fan 8 at each of two positions as described above, the action of dissipating the heat generated from the rear surface of the backlight unit 20 to the outside of the liquid crystal display device 1 is increased. Accordingly, the effect of preventing the heat of the backlight unit 20 from adversely affecting the control substrates 9 can be increased.

Figure 7:
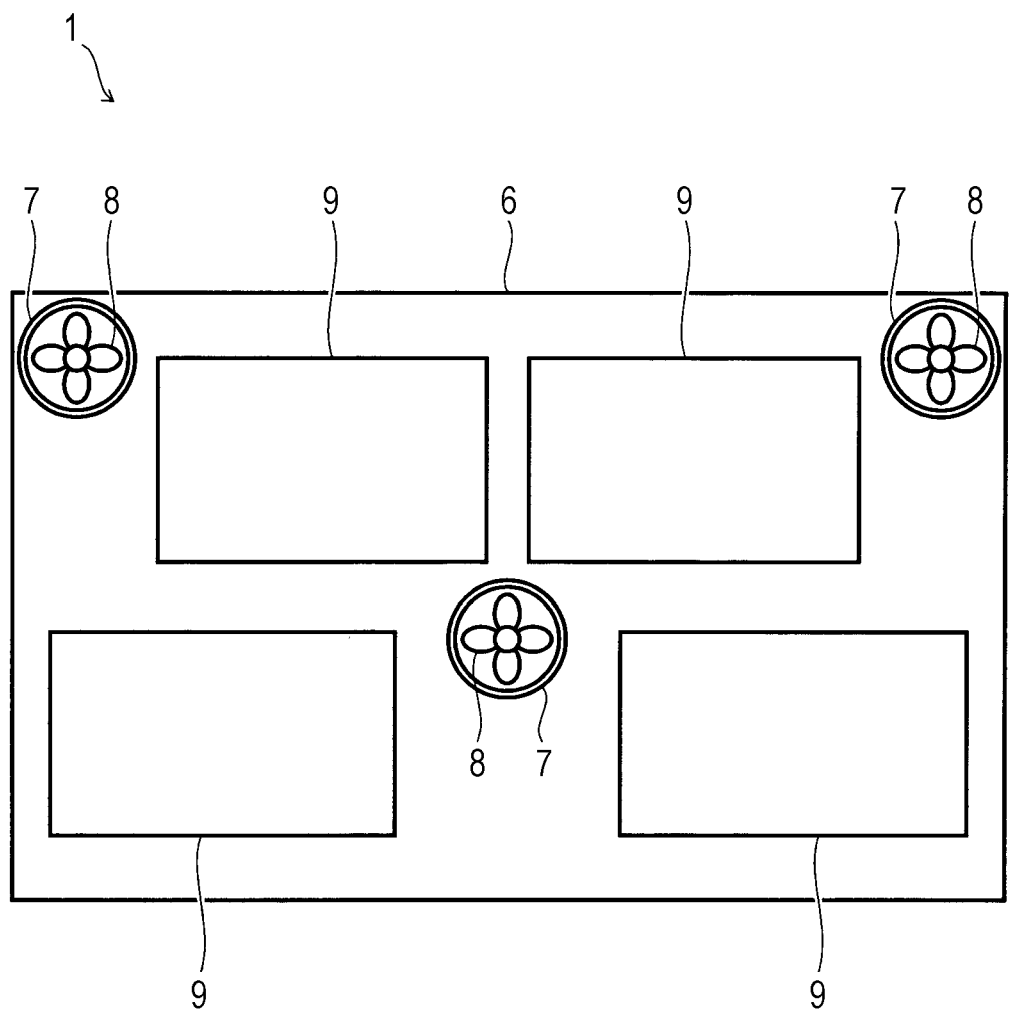
FIG. 7 is a rear view of a heat insulating frame of a liquid crystal display device according to a fourth embodiment of the present invention.

A liquid crystal display device according to a fourth embodiment of the present invention will be described below with reference to FIG. 7. FIG. 7 is a rear view of a heat insulating frame of the liquid crystal display device. It is to be noted that, because a basic configuration of the fourth embodiment is the same as that of the first embodiment described above with reference to FIGS. 1 to 4, constituent elements common to those in the first embodiment are denoted by the same reference signs and they are omitted from the drawings and the following description. In this regard, the screws 9b illustrated in FIG. 3 are omitted from FIG. 7.

In the liquid crystal display device 1 according to the fourth embodiment, as illustrated in FIG. 7, the exhaust channel 7 and the exhaust fan 8 are each disposed not only at two positions, i.e., on an upper left end portion and an upper right end portion of the rear surface of the heat insulating frame 6, but also at an additional one position, i.e., in a central portion thereof when viewed in both the right-and-left direction and the up-and-down direction. By providing the pair of the exhaust channel 7 and the exhaust fan 8 at each of three positions as described above, air can be avoided from stagnating in the space inside the heat insulating frame 6. Such a result further increases the action of dissipating the heat generated from the rear surface of the backlight unit 20 to the outside of the liquid crystal display device 1. Accordingly, the effect of preventing the heat of the backlight unit 20 from adversely affecting the control substrates 9 can be further increased.

Figure 8:
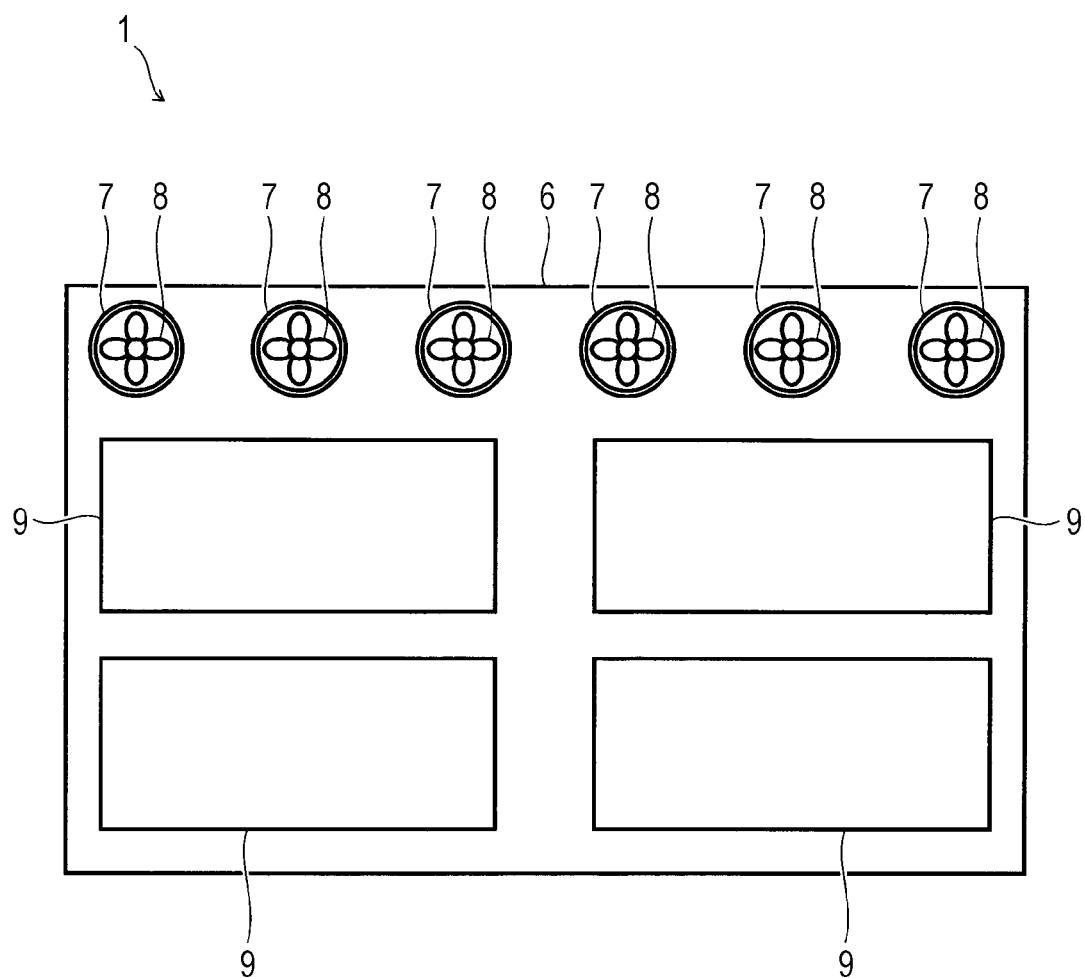
FIG. 8 is a rear view of a heat insulating frame of a liquid crystal display device according to a fifth embodiment of the present invention.

A liquid crystal display device according to a fifth embodiment of the present invention will be described below with reference to FIG. 8. FIG. 8 is a rear view of a heat insulating frame of the liquid crystal display device. It is to be noted that, because a basic configuration of the fifth embodiment is the same as that of the first embodiment described above with reference to FIGS. 1 to 4, constituent elements common to those in the first embodiment are denoted by the same reference signs and they are omitted from the drawings and the following description. In this regard, the screws 9b illustrated in FIG. 3 are omitted from FIG. 8.

In the liquid crystal display device 1 according to the fifth embodiment, as illustrated in FIG. 8, the exhaust channel 7 and the exhaust fan 8 are each disposed at six positions on an upper portion of the rear surface of the heat insulating frame 6 at equal intervals in the right-and-left direction. By providing the pair of the exhaust channel 7 and the exhaust fan 8 at each of six positions as described above, the action of dissipating the heat generated from the rear surface of the backlight unit 20 to the outside of the liquid crystal display device 1 is further increased. Accordingly, the effect of preventing the heat of the backlight unit 20 from adversely affecting the control substrates 9 can be further increased.

Figure 9:
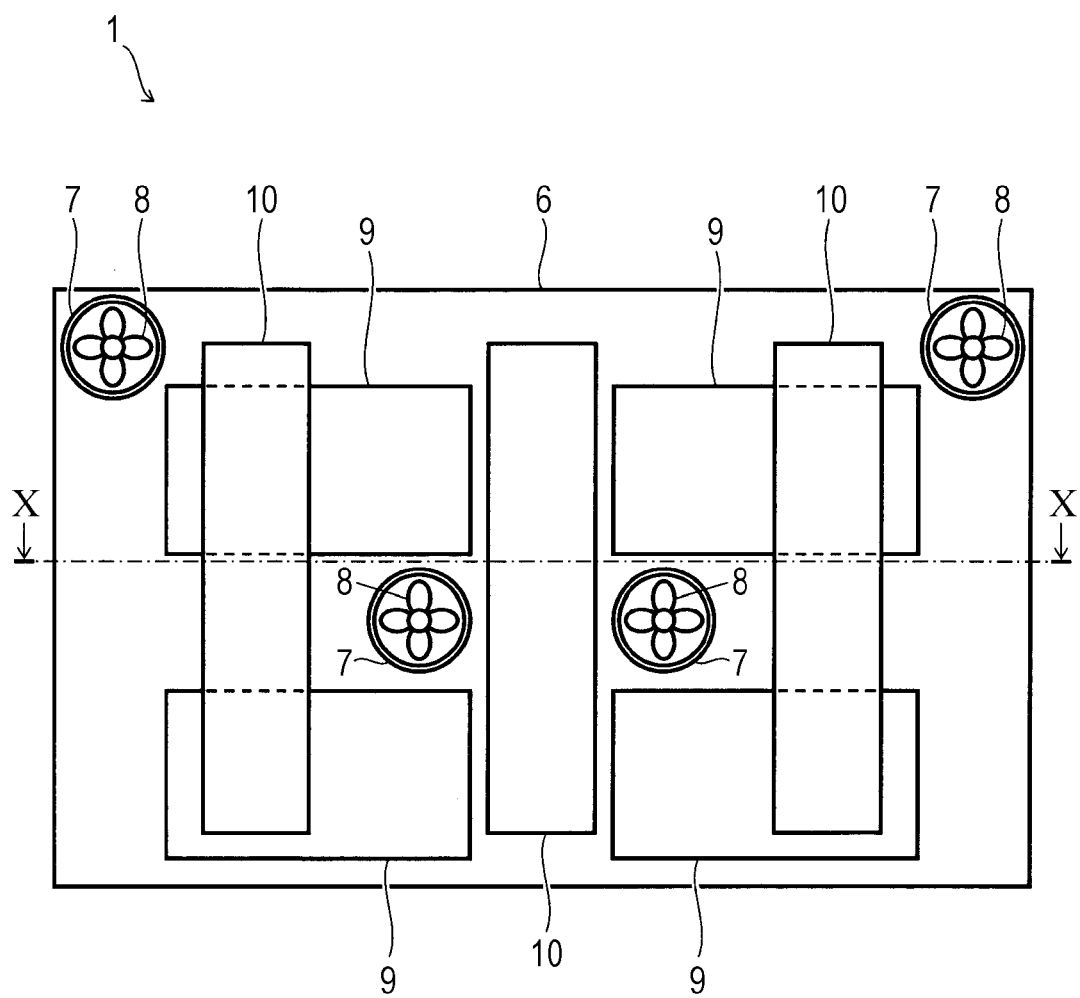
FIG. 9 is a rear view of a heat insulating frame of a liquid crystal display device according to a sixth embodiment of the present invention.
Figure 10:
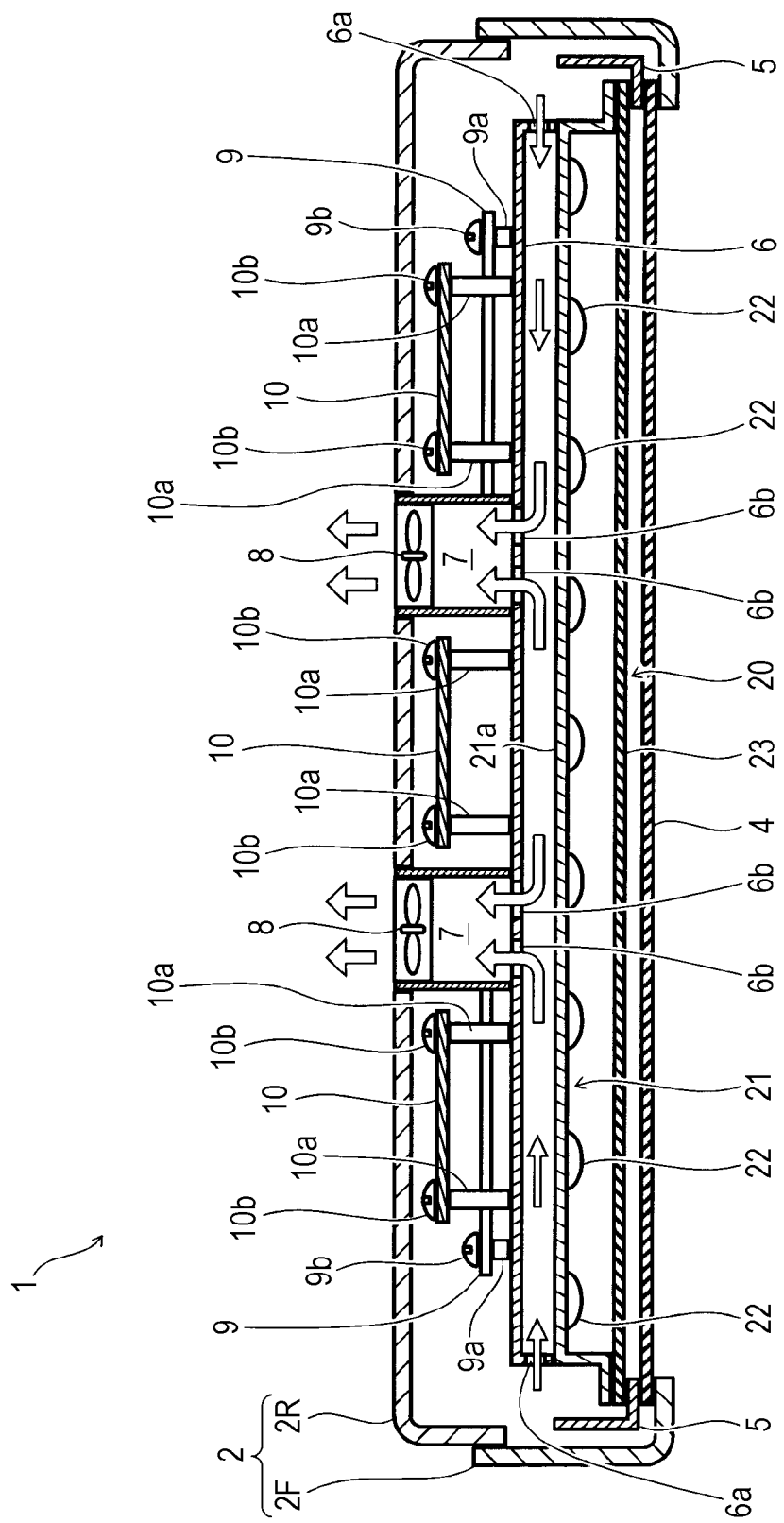
FIG. 10 is a horizontal sectional view, looking from above, of the liquid crystal display device according to the sixth embodiment of the present invention, the view being taken along a line X-X in FIG. 9.

A liquid crystal display device according to a sixth embodiment of the present invention will be described below with reference to FIGS. 9 and 10. FIG. 9 is a rear view of a heat insulating frame of the liquid crystal display device, and FIG. 10 is a horizontal sectional view, looking from above, of the liquid crystal display device, the view being taken along a line X-X in FIG. 9. Empty arrows in FIG. 10 indicate flow paths and flowing directions of air streams that are generated by a fan. It is to be noted that, because a basic configuration of the third embodiment is the same as that of the first embodiment described above with reference to FIGS. 1 to 4, constituent elements common to those in the first embodiment are denoted by the same reference signs and they are omitted from the drawings and the following description. In this regard, the screws 9b illustrated in FIG. 3 are omitted from FIG. 9.

In the liquid crystal display device 1 according to the sixth embodiment, as illustrated in FIGS. 9 and 10, control substrates 9 and 10 are arranged in two stages in overlapped relation at the back of the heat insulating frame 6. More specifically, the control substrate 9 is fixed to the rear surface of the heat insulating frame 6 by screws 9b with a spacing held therebetween by employing spacers 9a. At the back of the control substrate 9, the control substrate 10 is fixed to the rear surface of the heat insulating frame 6 by screws 10b with a spacing held therebetween by employing spacers 10a. The control substrate 9 is provided in number four, and the control substrate 10 is provided in number three.

Moreover, as illustrated in FIG. 9, the exhaust channel 7 and the exhaust fan 8 are each disposed on the rear surface of the heat insulating frame 6 at four positions not interfering with the control substrate 9 and 10. By providing the pair of the exhaust channel 7 and the exhaust fan 8 at each of four positions as described above, the action of dissipating the heat generated from the rear surface of the backlight unit 20 to the outside of the liquid crystal display device 1 can be increased even when comparatively large numbers of the control substrates 9 and 10 are arranged in multiple stages in overlapped relation.

While the embodiments of the present invention have been described above, the scope of the present invention is not limited to the foregoing embodiments, and the present invention can be practiced in various modified forms without departing from the gist of the invention.

For example, the positions where the exhaust channels 7 and the exhaust fans 8 are arranged, and the numbers of the exhaust channels 7 and the exhaust fans 8 are not limited to the layout positions and the numbers described above in the embodiments, and other layout positions and numbers may be set as required. The positions where the control substrate 9 and 10 are arranged relative to the rear surface of the heat insulating frame 6, and the numbers of the control substrate 9 and 10 are also not limited to the layout positions and the numbers described above in the embodiments, and other layout positions and numbers may be set as required.

INDUSTRIAL APPLICABILITY

The present invention can be applied to a display device that includes an illuminator emitting light toward an object to be illuminated, such as a liquid crystal display panel.

REFERENCE SIGNS LIST 1 liquid crystal display device (display device)
2 outer cover (housing)
4 liquid crystal display panel (display panel)
6 heat insulating frame (frame)
7 exhaust channel
8 exhaust fan (fan)
9, 10 control substrates
20 backlight unit (illuminator)
21 backlight chassis
22 LED
24 heat dissipating portion

The invention claimed is:

1. A display device comprising:
a display panel displaying an image,
an illuminator emitting light toward the display panel,
a control substrate including circuitry that controls the display panel and the illuminator, and
a housing containing the display panel, the illuminator, and the control substrate, wherein
the control substrate is arranged within the housing on a side opposite to a side including the display panel with respect to the illuminator, and
the display device further comprises:
  a frame, which is disposed between the illuminator and the control substrate, and which forms a space covering one surface of the illuminator on a side facing toward the control substrate;
  an intake port provided in the frame to allow air to flow into the frame therethrough;
  an exhaust channel that connects together the frame and the housing so as to make an inside of the frame and an outside of the housing communicate with each other; and
  a fan that exhausts air within the frame to the outside of the housing through the exhaust channel.

2. The display device according to claim 1, wherein the frame is formed of a heat insulating member.

3. The display device according to claim 1, wherein the exhaust channel extends from the frame toward the housing on the side opposite to the side including the display panel with respect to the illuminator.

4. The display device according to claim 1, wherein a heat dissipating portion that dissipates heat of the illuminator is disposed within the frame on a surface of the illuminator on a side facing toward the control substrate.

5. The display device according to claim 1, wherein
the space is defined between the illuminator and the frame; and
the control substrate is provided on a side of the frame opposite to the space.

6. The display device according to claim 1, wherein the frame includes a plurality of intake ports provided in right and left lateral surfaces, and an exhaust port provided in a rear surface of the frame.

7. The display device according to claim 1, wherein the control substrate is fixed to a rear surface of the frame with a predetermined spacing provided by a spacer.

8. The display device according to claim 1, wherein
the control substrate includes first and second control substrates which are arranged in two stages; and
the second control substrate is fixed to a rear surface of the first control substrate provided on a rear surface of the frame.

9. The display device according to claim 1, wherein the exhaust channel has a cylindrical shape and extends straightly from a rear surface of the frame toward a rear surface of the housing.

\* \* \* \* \*